Aug. 24, 1943.    R. B. TIERS    2,327,471
EDUCATIONAL APPARATUS
Filed Nov. 24, 1941    2 Sheets-Sheet 1
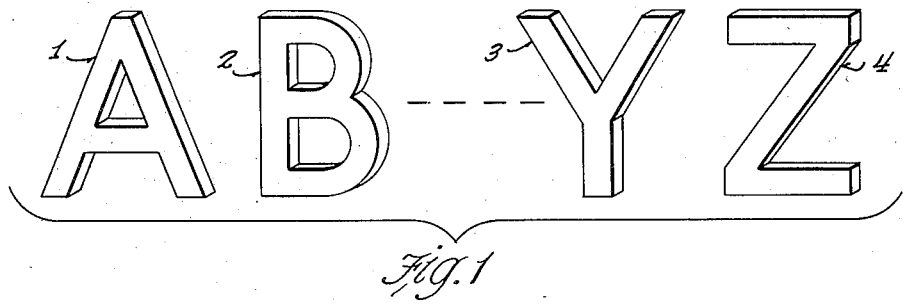
Fig. 1
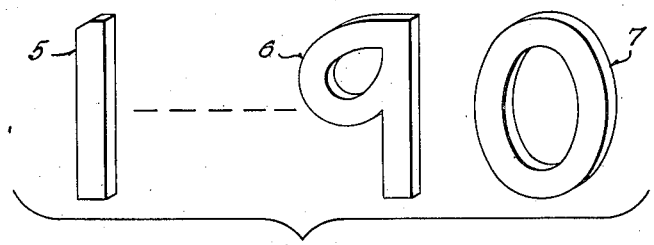
Fig. 2
  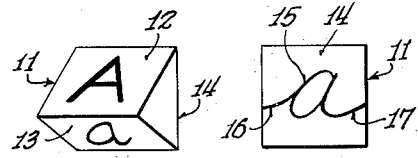 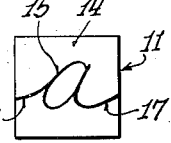
Fig. 3    Fig. 4    Fig. 5    Fig. 6
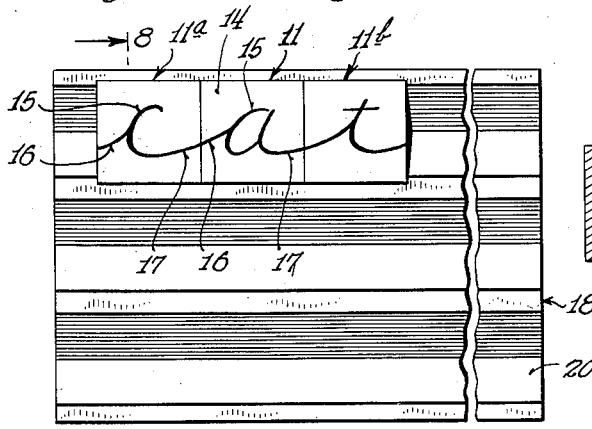 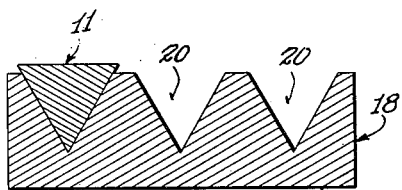
Fig. 7    Fig. 8
INVENTOR.
RUTH B. TIERS
BY
ATTORNEY.

Aug. 24, 1943.  R. B. TIERS  2,327,471
EDUCATIONAL APPARATUS
Filed Nov. 24, 1941  2 Sheets-Sheet 2
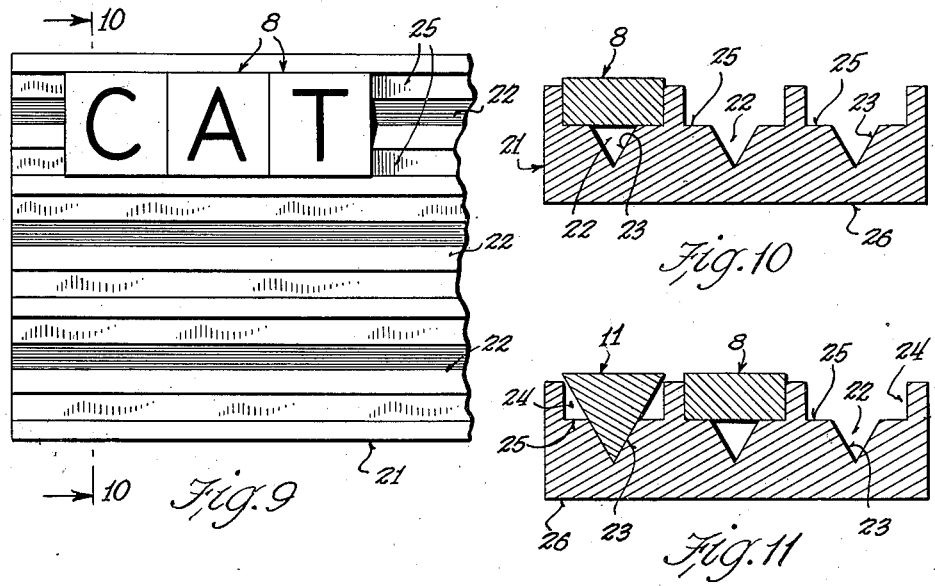
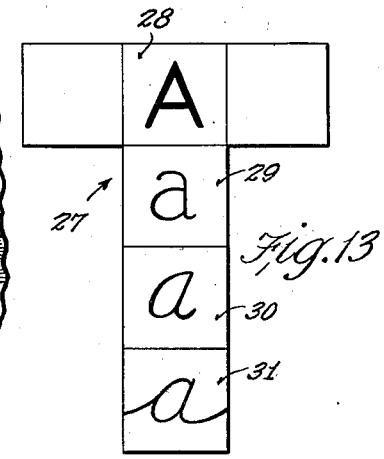
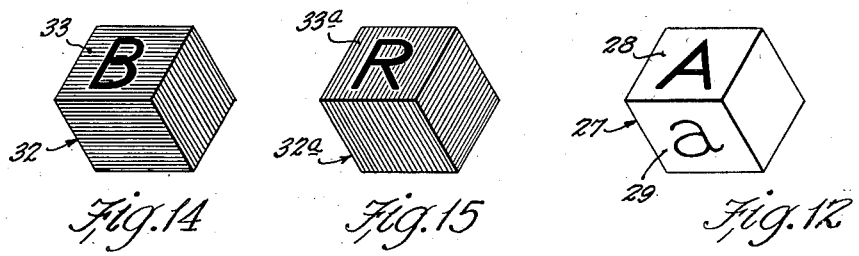
INVENTOR.
RUTH B. TIERS
BY
ATTORNEY.

Patented Aug. 24, 1943

2,327,471

UNITED STATES PATENT OFFICE 2,327,471

EDUCATIONAL APPARATUS

Ruth B. Tiers, Chicago, Ill.

Application November 24, 1941, Serial No. 420,202

4 Claims. (Cl. 35—35)

This invention relates to an educational apparatus.

In particular the invention is concerned with an apparatus for teaching children the alphabet, the numerals and to read, write and spell.

The first or fundamental phase of my invention contemplates the employment of certain key symbols in the form of the individual letters of the alphabet, in their printed capital or upper case form in Gothic or other type, and the cardinal numbers from one to zero. These key symbols are made sufficiently large in size to be readily and easily handled by the child in the manner of toy playing and building blocks in common use. By having the key symbols relatively large in size, the child in handling and playing with them and on being told their names will soon become aware by the shapes of the symbols with the respective letters of the alphabet and the cardinal numbers which they represent.

The second phase of my invention is concerned with the cooperating block-like elements which are used in connected relation with the key symbols. These secondary elements are preferably in the form of individual blocks and are equal in number to the key symbols in so far at least as the alphabetical letters are concerned. With twenty-six letters of the alphabet there will be a like number of the secondary elements, one for each of the key letters. These secondary elements will be in a form having at least two flat facets, preferably coextensive in area and on opposite sides of the block. These blocks or secondary elements will be considerably smaller than the key symbols, and in practice will be rectangular or of semi-cube form so as to be distinguishable from a third set of block-like elements which comprise the third phase of my invention.

The secondary elements carry the corresponding individual letters of the alphabet as depicted by the key symbols, there being this provision that each secondary element carries or displays its corresponding key symbol letter in its printed capital or upper case form on one face the same as the key symbol and the printed small or lower case form of the same letter on the opposite face of the block. The secondary elements are made considerably smaller than the larger key symbols so that the letters on the secondary elements may be brought down to a size in reasonable comparison to the size of these characters as they appear in every day use on the printed page and in books, newspapers, magazines and the like with which the child has early contact. The numbers could, of course, be taught by the key symbols alone, although the child's mind would be more forcibly impressed by having duplicates of the key numbers repeated in the secondary set.

In having the printed upper and lower case representations of the letters on the secondary elements on the opposite sides of the blocks the child in handling them will be required to turn over the blocks to see the characters thereon. In this way, the child will not have a merged or connected relation between the two letter forms, but visualize and soon recognize them as separate and distinct characters. The child will, however, by the secondary elements soon become conscious of the printed upper and the lower case forms of the letters due to their appearance on each secondary element. And as one of these forms is the same as the corresponding key symbol letter the child's mind will soon be impressed with the fact that the printed lower case form is another form of the key symbol letter by reason of the connected relation between the key symbols and the blocks. Hence, the child even at the young age of between two to four years, which is perhaps the most receptive period for learning, will in handling the key and the secondary symbols as herein pointed out soon learn to distinguish the several letters of the alphabet in both their printed upper and lower case forms. This is done with as much ease as the child takes to recognize physical objects about him, as for example, a chair, a table, a bed, a cat, and a dog, etc.

The third phase of my invention has reference to teaching the child the form of the written or script letters of the alphabet. This is accomplished by having the script letters on a third set of elements equal in number to the key symbols and thus equalling the secondary elements and of the same relative size. In practice, the third set of elements are preferably given a geometric form differing from that of the secondary elements to be readily and easily distinguishable therefrom. The third set of elements are preferably given triangularly prismatic form to provide three joined facets about the exterior of the element. One face carries the letter of the corresponding key symbol in its printed capital or upper case form the same as the key letter, while the other two faces carry the same letter in its capital and small letter script forms, respectively. As disclosed herein, the second face carries the letter in its capital script form, while the third face carries the letter in its small script form. This provides a means for conveying to the child's mind the script letter forms and makes the child conscious of the various forms of each key letter due to the connected relation between the key symbols and the two sets of subsidiary blocks.

In connection with the small script letters, my invention contemplates a registering feature which will further impress on the child's mind that the script form is used as a distinct group. Also, this registering feature presents to the child, the fact that there is a continuity of connection between the script letters and this conveys the intended thought that these script characters are used in a connected relation as in the written language. In carrying out this phase of my invention, the registering feature referred to may be included in the script form of the letter itself. In fact, the result is attainable by providing extensions on each letter on its opposite sides and having these extensions continued to the edge of the faces on which the letter is displayed and at the same points on all of the script blocks. Hence, one script letter may be made to line up with another script letter when the blocks are placed in side by side relation in a word forming order. For example, with the simple word "cat" the extensions on the middle letter will aline with the extensions on the two adjacent letters and indicate to the child the general manner in which these script letters are connected in a written word order. From this the child perceives the script order and in time associates the other letter forms in spelling words as they are learned.

The fourth phase of my invention is concerned with holders into which the secondary and the third block elements may be inserted in a letter or a number displaying position. For the triangularly prismatic elements, I provide a holder having grooves or channels of complementary size and shape to receive these elements. For the semi-cubes, I provide a holder with grooves or channels of a size and shape to take these elements. To accommodate either of the two forms of elements interchangeably, I provide a holder in which the grooves or channels have intersecting portions one of a shape to receive the prisms and the other of a shape to receive the semi-cubes.

A further phase of my invention is concerned with displaying the key letters in their printed and script upper and lower case forms, respectively, on one block element and with teaching the various colors. This and the holders and the various mechanical features of my invention will be described in the subjoined specification taken in connection with the accompanying drawings, in which—

Fig. 1 is a group showing of several of the key symbols in perspective representing the printed capital or upper case letters of the alphabet in block form from "A" to "Z";

Fig. 2 is a like showing of the key symbols representing the cardinal numbers from "1" to "0";

Fig. 3 is a perspective view of one of the secondary elements positioned to show the printed capital or upper case form of a letter on one face of the block;

Fig. 4 is a bottom plan view of the secondary element to show the printed small or lower case form of the letter on the reverse face of the block;

Fig. 5 is a perspective view of one of the triangularly prismatic elements positioned to show the printed capital or upper case form of a letter on one face and the capital script form of the letter on a connected face;

Fig. 6 is a face view of the above element showing the small script form of the letter on a third face of the block;

Fig. 7 is a top plan view of a holder for the prismatic elements, three of the same being shown in the holder in a word spelling order;

Fig. 8 is a cross-sectional view of the holder of the preceding figure taken on line 8—8 thereof;

Fig. 9 is a top plan view of a holder for both the secondary and the prismatic elements, three of the former being shown in the holder in the same word order as the elements in Fig. 7;

Fig. 10 is a transverse sectional view taken on line 10—10 of Fig. 9;

Fig. 11 is a similar sectional view showing one of the prisms in the holder;

Fig. 12 is a perspective view of a cube element similar to that of Fig. 5, but containing the printed upper and the lower case forms of a letter on two faces and the capital and smaller script forms of the letter on two of the other faces of the block;

Fig. 13 is a developed view of the cube to show the various letters forms carried thereby;

Figs. 14 and 15 are perspective views of two of the elements of a color teaching group; and Fig. 16 shows the use of spacer elements to be hereinafter described.

As indicated in Fig. 1, the key symbols of my invention are in the form of the individual letters of the alphabet in their printed capital or upper case form. For illustration, I have shown in Fig. 1 only four of these key symbols of an entire set or group. The "A" is marked 1; the "B" is marked 2; the "Y" is marked 3; and the "Z" is marked 4. It is to be understood that the key symbol group will comprise all of the letters of the alphabet from "A" to "Z" in Gothic or other style. There will be twenty-six key symbols for a full set and each symbol will be sufficiently large in size and mass to be readily and easily handled by a child in the use of the symbol. Moreover, these key symbols will be uniform in size so as to be distinguishable as a group from the other elements which comprise and encompass the other phases of my invention as first above stated. These key symbols may be made in solid or hollow form of wood, plastic or other desired material. Also the edges of the characters may be rounded or beveled to make for easier handling and avoid injury to the child when in use. The symbols may be suitably colored to render them more attractive and pleasing and, if desired, a uniform color scheme may be adopted for an entire set. In practice, the key symbols will be made about three inches in height and three quarters of an inch in thickness. These dimensions are recited by way of illustration and not by way of limitation.

In Fig. 2, the key symbols are in the form of the cardinal numbers from one to zero so that my invention may be used in teaching the numbers. In Fig. 2, the "1" is marked 5; the "9" is marked 6; and the "0" is marked 7. These symbols will be of the same character and size as the letter symbols in Fig. 1.

The secondary elements are similar to the one indicated in Fig. 3. Here, the element 8 is rectangular in form and has flat faces two of which are marked 9 and 10, respectively. These faces are of substantially the same size and shape and are located on opposite sides of the block. These secondary elements are equal in number to the key symbols for the letters and carry or display the corresponding key letters in their printed upper and lower case forms, respectively. For example, the secondary element 8 for the key symbol letter "A" (marked 1 in Fig. 1) will have on the face 9 the letter "A" in its printed capital form the same as represented by the key symbol 1. The face 10 will display the letter "A" in its printed lower case form as shown in Fig. 4. The other faces of the element 8 may be left blank. This system is carried out for all of the letters of the alphabet, there being a secondary element 8 for each alphabet letter with the printed upper and lower case forms, respectively, on the opposite faces of the block. For the numerals secondary elements may be provided. The elements will be made in a uniform size for the entire group and will be preferably all one color.

The third set of elements employed with my invention are in block-like form, a triangularly prismatic form being shown at 11 in Fig. 5. Here, the element 11 has three connected faces 12, 13 and 14, respectively. These are the faces which are in regular order about the block. The face 12 carries or displays one of the key symbols of Fig. 1 with which the prism is associated. Like the secondary elements, the prismatic elements 11 will be equal in number to the key symbols and will be uniform in size and color. As indicated in Fig. 5, the face 12 carries the letter "A" in its printed capital or upper case form the same as the key letter 1. The face 13 carries the capital script form of said letter, while the third face 14 of the prism carries the small script form of the letter "A" as shown at 15. The corresponding arrangement for the other key letters will be carried out on the other elements 11 of the third group. This may also include the numerals if desired. It will be noted in Figs. 3 to 6 that the elements 8 and 11 display the letters individually on their respective faces.

The elements 8 and 11 of the second and third groups will be about relatively equal in size, but considerably smaller than the key symbol letters. This is done to reduce the characters to a small size for the purpose heretofore mentioned and to have the subsidiary elements 8 and 11 subservient to the dominating key symbols of the main or fundamental group. Hence, the child will be guided by the key symbol letters and associate the letter forms on the smaller elements 8 and 11 with the larger dominating key letter forms. In practice, the elements 8 and 11 may be made on a one inch dimension with the elements 8 approximately one-half of an inch thick. In bringing the elements 8 and 11 down to this relatively small size the child will have letter and numeral blocks with which to build and play as the customary toy blocks in common use.

The registering feature of my invention is shown in Figs. 6 and 7. Here, it will be observed that the small script letter 15 has extensions 16 and 17 on its opposite sides. These extensions continue to the associated side edges of the block and intersect them. As indicated in Fig. 7, the block elements 11a and 11b which are of the same group as the element 11, but differently referenced for illustrative purposes herein, have corresponding extensions 16 and 17 on their respective script letters 15. The extensions on the several letters intersect the block edges at the same points so that the blocks when arranged in a word order as in Fig. 7 will have the extensions in register and indicate thereby the connected relation of the script letters in writing. This registering feature has the important advantage of impressing on the child's mind that the script letters are used in the connected relation shown. This connected relation of the script letters is also helpful in teaching the child to read, write or spell, both as to the script and the printed letter forms. Learning to read, write or spell, for example the word "cat" in script form the child soon perceives by turning over the blocks to view the other faces that the same word appears in the other letter forms as indicated in Fig. 9. Hence, the child learns to associate all of the various forms of the letters in a word order and the task of learning reading, writing and spelling is much simplified and accomplished as a pleasant task and not a laborious one.

The holders for the blocks 8 and 11 are shown in Figs. 7 to 11. These holders may be made of wood, plastic or other material and of a size and shape to take a full set of the blocks. The holder 18 in Figs. 7 and 8 has a flat base 19 to seat the holder on a floor or table as the case may require. The holder 18 is fashioned to provide a number of upwardly opening parallel grooves or channels 20 on its upper side with the grooves or channels in V-shape form and of a size to accommodate the prism elements 11. The grooves 20 extend the full length of the holder and may be closely spaced in rows as shown in Figs. 7 and 8.

The holder 21 in Figs. 9 to 11 is similar to the holder in Figs. 7 and 8, except that the grooves or channels 22 are shaped to receive both the prisms 11 and semi-cubes 8 interchangeably. As shown in Figs. 10 and 11, the prisms 11 fit in the lower V-shaped portions 23 of the channels 22 with the upper faces of the prisms exposed to view on the top side of the holder. The semi-cubes 8 fit within the upper portions 24 of the channels 22, the upper ends of the channels being enlarged to receive the semi-cubes. This provides shoulders 25, 25 to seat the semi-cubes and hold them substantially flush with each other and with the prisms when the latter are in the holder with the semi-cubes. The bottom face 26 of the holder 21 is flat for supporting the holder on a level surface.

In Fig. 9, I have shown the semi-cubes 8 in the holder 21 in a groove or channel 22 spelling the word "cat" in printed capital form. Reversing the elements 8 would spell the same word in printed lower case form. With the grooves 22 also capable of receiving the prism elements 11 and being parallel, the prismatic elements could be inserted in the groove next adjacent to the groove holding the semi-cubes to display the word "cat" in small script form the same as in Fig. 7. Hence, with the holder 21 made to hold the elements 8 and 11 a word could be displayed in its several letter forms, upper and lower cases in printed and script, respectively. In this way, the child could be further impressed with the significance of the several forms of a key symbol and also be made to realize more forcibly the connected relation between the letter forms as indicated on the respective symbols comprising my invention.

In Figs. 12 and 13, I have shown a cube element 27 having on its four faces a display of a letter in its printed upper and lower case forms on faces 28 and 29 and capital and small letter script forms on its faces 30 and 31.

Figs. 14 and 15 show cubical elements employed in teaching the colors. The element 32 in Fig. 14 is lined to represent a blue color and displays on one face 33 thereof the letter "B" for the word "blue." In Fig. 15 the element 32a is lined to indicate a red color and carries on one face 33a the letter "R" for the word "red." Similar blocks would be provided for the primary and the secondary colors. In connection with this phase of my invention, the colors could be indicated by having the block elements of one shade and the letter symbols on the respective blocks in the color to be represented by each block.

Instead of employing blocks in the form of cubes to teach the colors as just above referred to, it is within the contemplation of my invention to provide color indicating elements in either or both of the semi-cube set 8 or in the prismatic set 11. This as indicated on the cubical elements 32 and 32a in Figs. 14 and 15 will provide blank faces on the color blocks and enable these blocks to be used as spacers in a holder as shown at 34, 35 in Fig. 16. Here, the blocks are in prismatic form. When the color indicating blocks are in semi-cube form, these blocks may be employed as spacers in the holders for such blocks or as spacers for the prismatic blocks in the holders shown in Figs. 9 to 11. In connection with all of the blocks, that is, 8, 11 and 21, it will be noted that they carry on the respective faces thereof the individual letters or numerals which they display, there being no other letters or numerals on the same faces of the blocks to detract from the individual symbols which the blocks display.

From the foregoing specification and drawings it will be apparent that my invention provides a simple apparatus which may be used in the home to teach children their letters and numbers and to read, write and spell at an early age. In brief, my improved apparatus provides a logical beginning for a child's education and by reason of the connected relation between the key symbols and the blocks in carrying a key letter from block to block the objects of my invention as herein expressed may be readily and easily accomplished.

The details of construction and arrangement of parts shown and described may be variously changed and modified without departing from the spirit and scope of my invention, except as pointed out in the appended claims.

I claim as my invention:

1. An educational apparatus of the character described for teaching the letters of an alphabet and reading and spelling comprising, a set of detached relatively large cut-out letters adapted to be individually handled corresponding to the different letters of the alphabet in capital letter form, and a set of relatively smaller detached blocks adapted to be individually handled having rectangular outer faces, there being one block for each of the cut-out letters and having singly and prominently displayed on one rectangular face thereof the same letter as the cut-out letter with which the block is associated in the same capital letter form as the cut-out letter and on another rectangular face of the block singly and prominently displayed the same letter as the cut-out letter in a small letter form, whereby in the use of the cut-out letters as the key letters and matching the capital letter form of the letter on the block with the corresponding larger cut-out key letter the small letter form of the key letter may be determined by viewing the other face of the block displaying the small letter form.

2. An educational apparatus of the character described for teaching the letters of an alphabet and reading and spelling comprising, a set of detached relatively large cut-out letters adapted to be individually handled corresponding to the different letters of the alphabet in printed capital form, and a set of relatively smaller detached rectangular blocks adapted to be individually handled, there being a block for each of the cut-out letters and having singly and prominently displayed on the upper face thereof the same letter as the cut-out letter with which the block is associated in the same printed capital form as the cut-out letter and on the bottom face of the block singly and prominently displayed the same letter as the cut-out letter in a printed small letter form, whereby in the use of the cut-out letters as the key letters and matching the printed capital form of the letter on the block with its corresponding larger cut-out key letter the printed small letter form of the letter may be determined by turning over the block to view the letter displayed on its bottom face.

3. An educational apparatus of the character described for teaching the letters of an alphabet and reading, spelling and writing comprising, a set of detached relatively large cut-out letters adapted to be individually handled corresponding to the different letters of the alphabet in printed capital form, and a set of smaller detached triangularly prismatic blocks, one for each of the cut-out letters and having singly and prominently displayed on each of the three symmetrically connected outer faces thereof the same letter as the cut-out letter with which the block is associated in the same printed capital form as the cut-out letter on one face, the same letter as said cut-out letter in capital script form on the second face and the same letter as the cut-out letter in small letter script form on the third face, whereby in the use of the cut-out letters as the key letters and matching the printed capital form of the letter on the block with its corresponding larger cut-out letter the capital and small letter script forms, respectively, may be determined by viewing the faces of the block displaying the script forms of the letters.

4. A holder for the purpose and of the character described having a body portion forming a base and provided with a row of upwardly opening grooves, V-shaped and rectangular flat sided blocks to be supported in said grooves, said grooves having their lower portions V-shaped to support the V-shaped blocks and their upper portions widened out on opposite sides of the V-shaped portions to provide shoulders therebetween to support the rectangular flat blocks in crossing relation to the grooves whereby both sets of blocks may be interchangeably inserted in the grooves, the grooves having a depth to support the blocks with their exposed upper faces in substantially coplanar relation.

RUTH B. TIERS.